(12) United States Patent
Hepburn et al.

(10) Patent No.: US 7,240,482 B2
(45) Date of Patent: *Jul. 10, 2007

(54) SYSTEM FOR MINIMIZING THE IMPACT OF POISONING OF AUTOMOTIVE EXHAUST AFTERTREATMENT SYSTEMS

(75) Inventors: Jeffrey Scott Hepburn, Birmingham, MI (US); Carolyn Parks Hubbard, Dearborn Heights, MI (US); Gang Guo, Ypsilanti, MI (US); Lifeng Xu, Farmington Hills, MI (US); Robert Walter McCabe, Lathrup Village, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/855,831

(22) Filed: May 27, 2004

(65) Prior Publication Data

US 2004/0219075 A1 Nov. 4, 2004

Related U.S. Application Data

(62) Division of application No. 10/063,285, filed on Apr. 8, 2002, now Pat. No. 6,810,660.

(51) Int. Cl.
*F01N 3/00* (2006.01)

(52) U.S. Cl. .............. 60/285; 60/295; 60/297; 60/311; 55/DIG. 30; 55/523

(58) Field of Classification Search .............. 60/274, 60/285, 295, 297, 311; 55/DIG. 30, 479, 55/523
See application file for complete search history.

(56) References Cited

U.S. PATENT DOCUMENTS

| | | | | |
|---|---|---|---|---|
| 3,815,337 A | * | 6/1974 | Lenane | 96/386 |
| 3,966,443 A | * | 6/1976 | Okano et al. | 55/337 |
| 4,258,099 A | * | 3/1981 | Narumiya | 210/510.1 |
| 4,264,346 A | * | 4/1981 | Mann | 55/523 |
| 4,420,316 A | * | 12/1983 | Frost et al. | 55/523 |
| 4,934,142 A | * | 6/1990 | Hayashi et al. | 60/297 |
| 5,310,548 A | * | 5/1994 | Tsuru et al. | 424/76.3 |
| 6,311,485 B1 | * | 11/2001 | Becker et al. | 60/324 |
| 6,810,660 B2 | * | 11/2004 | Hepburn et al. | 60/285 |

* cited by examiner

*Primary Examiner*—Binh Q. Tran
(74) *Attorney, Agent, or Firm*—Diana Brehob

(57) ABSTRACT

An exhaust aftertreatment system for an internal combustion engine is disclosed which mitigates deleterious poisoning of a catalytic converter or exhaust gas oxygen sensor by phosphorus containing species.

25 Claims, 3 Drawing Sheets

SYSTEM FOR MINIMIZING THE IMPACT OF POISONING OF AUTOMOTIVE EXHAUST AFTERTREATMENT SYSTEMS

RELATED APPLICATIONS

The present application is a divisional of U.S. application Ser. No. 10/063,285, filed 8-Apr.-2002 now U.S. Pat. No. 6,810,660.

BACKGROUND OF INVENTION

1. Field of the Invention

The present invention relates generally to a system for minimizing the deleterious impact of oil-derived phosphorus containing compounds on automotive exhaust aftertreatment systems.

2. Background of the Invention

Automotive oils typically contain a zinc dialkyldithiophosphate (ZDDP) additive which forms an antiwear coating on engine components and acts as an antioxidant in the oil. Although engines are designed to minimize the quantity of engine oil exiting the engine via the combustion chamber and exhaust system, it is inevitable that a small fraction of engine oil is released by this mechanism. The ZDDP additive of engine oil deleteriously affects catalytic converters due to phosphorus from the ZDDP interfering with active sites within the catalyst. These phosphorus containing species deposit onto, or react with washcoat components, such as aluminum oxide and cerium oxide, and remain there indefinitely. This phenomenon is commonly referred to as phosphorus poisoning.

Measures to eliminate or reduce ZDDP in engine oils have been investigated. Alternatives to ZDDP have been produced which have been shown to provide antioxidant and antiwear properties similar to ZDDP. However, they are cost prohibitive. Engine oils may be formulated with a lesser amount of ZDDP with the consequences that engine wear and oil oxidation increase, the former limiting engine life and the latter reducing useful oil life.

The inventor of U.S. Pat. No. 5,857,326 has disclosed an exhaust poison trap which comprises a helical wall dividing the exhaust chamber into longitudinal helical passages for exhaust gas flow and porous means covering the interior of the peripheral wall. The inventor of '326 teaches that exhaust gas is directed in a helical path causing particulate matter in the gas to be accelerated outwardly by centrifugal force and trapped in the porous means. The inventor of the present invention has recognized several limitations of the approach in '326. The helical passages cause the exhaust gases to be rotated and particles that have a diameter less than a certain size follow the flow and avoid being trapped in the porous means near the walls of the tube and larger particles impact the porous means near the walls. The device disclosed in '326 has the capability of causing only the largest particles to be removed. The figures in '326 indicate that the helical wall causes the flow to rotate through at least two revolutions and as many as four revolutions. The length of the exhaust poison trap is approximately two to four pipe diameters long with the disadvantages of complicating the packaging of the exhaust poison trap and increasing the weight of the trap, the thermal mass of which interferes with the desire to bring the catalytic converter to its operating temperature as soon as possible after starting the engine to control cold start emissions.

SUMMARY OF INVENTION

Disadvantages of prior art are overcome by an exhaust aftertreatment system for a spark-ignition, reciprocating internal combustion engine having a catalytic converter in an exhaust duct of the engine which receives an exhaust gas stream from the engine. The system comprises a trap in the exhaust duct located upstream of the catalytic converter. The trap is made of a porous ceramic or metallic material having an average pore size greater than about 80 micrometers. The porous material substantially fills the cross-section of the exhaust duct and has a volume of than 10% of a swept volume of the engine's cylinders coupled to the trap. Exhaust gases undergo multiple, random turns in traveling from an upstream side to a downstream side of the trap. The trap is located within 15 centimeters of the catalytic converter. An exhaust gas component sensor is placed downstream of the phosphorus trap.

Also disclosed is an exhaust aftertreatment system for processing exhaust gases from a reciprocating internal combustion engine, which includes a catalytic converter disposed in an exhaust duct of the engine. The catalytic converter has channels for conducting exhaust gases from an upstream end to a downstream end. The channels are substantially parallel to each other and parallel to a direction of flow through the catalytic converter. The catalytic converter has a ceramic or metallic porous material disposed within the channels from the upstream end of the catalytic converter for a predetermined distance along the catalytic converter. The porous material has randomly oriented passageways causing the exhaust gases to undergo multiple turns in the course of being transmitted through the porous material.

Also disclosed is an exhaust aftertreatment system for a reciprocating internal combustion engine comprising a phosphorus trap in an exhaust duct of the engine made of a porous material and substantially filling the cross-section of the exhaust duct. The porous material has an average pore size greater than a predetermined pore size and has randomly oriented passageways forcing exhaust gases passing through to undergo multiple turns. The system also has a catalytic converter disposed in the exhaust duct of the engine located downstream of the phosphorus trap and an electronic control unit operably connected to the engine. The electronic control unit provides an indication of an amount of phosphorous containing material trapped in the phosphorus trap and raises temperature in the phosphorous trap above a predetermined temperature when the amount of phosphorous containing material exceeds a predetermined quantity. The indication is based on time of operation or a value of an engine parameter since the predetermined temperature has been achieved.

A primary advantage of the present invention is that phosphorus contamination of the exhaust aftertreatment system can be decreased by approximately 60% in the absence of taking other preventative measures, which are costly. Reduced phosphorus contamination, as provided by the present invention, allows the catalyst to operate at high conversion efficiency over the life of the vehicle.

The inventors of the present invention have recognized that the effectiveness of the phosphorus trap is improved if it operates at a temperature close to the temperature of the catalytic converter. Thus, another advantage of the present invention is higher capture efficiency of deleterious phosphorus containing particles by placing the phosphorus trap in close proximity to the catalytic converter.

Another advantage of the present invention is that it removes particles of smaller diameter than prior approaches and does so with a neglible pressure drop across the phosphorus trap.

Yet another advantage of the present invention is that vehicles with unusual driving patterns may be operated in such a way to allow such vehicles to also benefit from the present invention.

The present invention may also be used to advantage combined with quick warmup strategies such as cold start spark retard and exhaust port oxidation.

The inventors of the present invention have recognized that the phosphorus trap may be much smaller than in prior approaches. The smaller size affects the warmup time of the exhaust system less than larger traps, a decided advantage in preventing cold start emissions.

Another advantage of the present invention is that, if the phosphorus trap is placed upstream of an exhaust gas oxygen sensor or other exhaust component sensor, deterioration of the sensor is prevented or slowed.

Without a phosphorus trap located upstream of a catalytic converter, the converter volume is chosen which provides sufficient conversion capacity over the targeted lifetime. An advantage of the present invention is that the volume can be reduced because the phosphorus trap protects the catalytic converter from phosphorus poisoning.

Yet another advantage is that, if the phosphorus trap is coated with a washcoat, it can provide some additional conversion capability, particularly during cold start.

The above advantages, other advantages, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
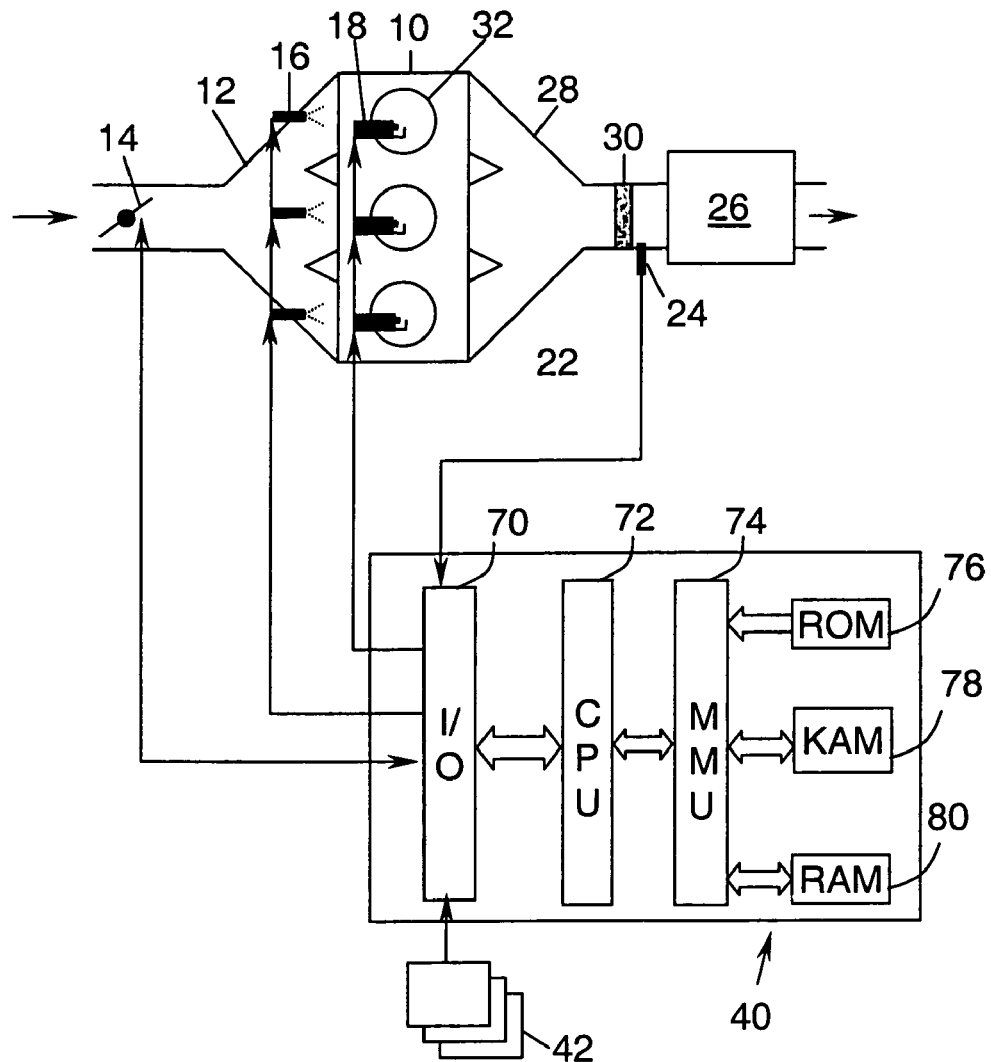
FIG. 1 is a schematic of an engine equipped with a phosphorous trap according to an aspect of the present invention.

An engine 10 equipped with a phosphorous trap 30 according to an aspect of the present invention is shown in FIG. 1. Engine 10 is supplied air through intake manifold 12 past throttle valve 14 and is supplied fuel through fuel injectors 16 spraying fuel into intake manifold 12. The configuration shown in FIG. 1 is commonly referred to as port fuel injection. The present invention also applies to direct fuel injection, in which fuel injectors 16 are installed directly in cylinders 32, central fuel injection, in which a single fuel injector 16 is placed in intake manifold 12 closer upstream of where intake manifold 12 separates into individual runners supplying individual cylinders 32, carburetion, and other fuel supplying devices. Ignition is provided by spark plugs 18. The exhaust gases are expelled through exhaust manifold 28, into phosphorus trap 30, into catalytic converter 26, and exhausted to the atmosphere. Sensor 24 is an exhaust gas component sensor, preferably an exhaust gas oxygen sensor. Alternatively, sensor 24 is a NOx sensor, HC sensor, CO sensor, or other component sensor.

ECU 40 is provided to control engine 10 as shown in FIG. 1. ECU 40 has a microprocessor 72, called a central processing unit (CPU), in communication with memory management unit (MMU) 74. MMU 74 controls the movement of data among the various computer readable storage media and communicates data to and from CPU 72. The computer readable storage media preferably include volatile and non-volatile storage in read-only memory (ROM) 76, random-access memory (RAM) 80, and keep-alive memory (KAM) 78, for example. KAM 78 is used to store various operating variables while CPU 72 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 72 in controlling the engine or vehicle into which the engine is mounted. The computer-readable storage media may also include floppy disks, CD-ROMs, hard disks, and the like. CPU 72 communicates with various sensors and actuators via an input/output (I/O) interface 70. Examples of items that are actuated under control by CPU 72, through I/O interface 70, are fuel injection timing, fuel injection rate, fuel injection duration, throttle valve 14 position, spark plug 18 timing, and others. Sensors 42 communicating input through I/O interface 70 may be indicating engine rotational speed, vehicle speed, coolant temperature, intake manifold 12 pressure, pedal position, throttle valve 14 position, air temperature, exhaust temperature, and air flow. Some ECU 40 architectures do not contain MMU 74. If no MMU 74 is employed, CPU 72 manages data and connects directly to ROM 76, RAM 80, and KAM 78. The present invention could utilize more than one CPU 72 to provide engine control and ECU 40 may contain multiple ROM 76, RAM 80, and KAM 78 coupled to MMU 74 or CPU 74 depending upon the particular application.

Catalytic converter 26 is commonly called a three-way catalyst which can process NOx, hydrocarbons, and CO, although the invention can potentially be used with a wide variety of catalyst systems including those for lean-burn engines, diesel engines, and various alternatively fueled vehicles among others. Although only one converter is shown in FIG. 1, it should be appreciated that most vehicles contain multiple catalyst elements, sometimes in the same converter housing and sometimes in separate converters. V engines often contain separate catalytic converters coupled to each engine bank of engine cylinders. In addition, typical converter systems consist of a catalyst mounted close to the engine (light-off converter) and one or more converters located downstream in either so-called to-board or under-body positions. In the present invention, the converter of greatest inters is the light-off converter because this is the one in which the majority of the poison species are captured.

Typical three-way catalysts are comprised of extruded ceramic or metallic material forming a myriad of parallel passageways of about 1 millimeter in hydraulic diameter. The extruded substrate is treated to provide precious metals on the surface of the passageways through the substrate via high-surface-area washcoat components such as aluminum oxide, cerium oxide, and zirconium oxide. In particular, the cerium and zirconium oxide materials, and combinations of the two, constitute oxygen storing species which improve the efficacy of the conversion process. When these oxygen storage sites are occupied by phosphorus containing compounds, the number of oxygen storage sites that can be used for aiding in converting CO, NOx, and hydrocarbons is decreased. Alternatively, phosphorus species can react with aluminum oxide to form aluminum phosphate, thereby causing densification of the washcoat structure, pore blocking, and occlusion of active noble metals. Yet another mechanism by which phosphorus species can interfere with catalyst effectiveness is through the formation of an overlayer on the surface of the washcoat. This overlayer generally consists of various phosphate compounds of zinc, calcium, and magnesium, and can impede the diffusion of the reactive gases from the bulk gas stream to the active sites within the washcoat layer. If phosphorus contamination continues, in time, the effectiveness of catalytic converter 26 is seriously impaired.

In FIG. 1, catalytic converter 26 is shown separated from phosphorus trap 30 and exhaust gas oxygen sensor 24 is placed downstream of phosphorus trap 30. Like catalytic converter 26, exhaust gas oxygen sensor 24 is treated with precious metals bonded onto its surface to catalyze the reaction of CO, NOx, and hydrocarbons. Exhaust gas oxygen sensor 24 is also harmed by contamination by phosphorus containing species. Thus, an advantage of the configuration shown in FIG. 1 is that exhaust gas oxygen sensor 24 is protected from deterioration by phosphorus species.

Alternatively, phosphorus trap 30 is placed within the catalytic converter 26 housing at the upstream end of catalytic converter 26 (configuration not shown). In this configuration, exhaust gas oxygen sensor 24 is located upstream of both catalytic converter 26 and phosphorus trap 30 and is not protected from phosphorus contamination.

Figure 2:
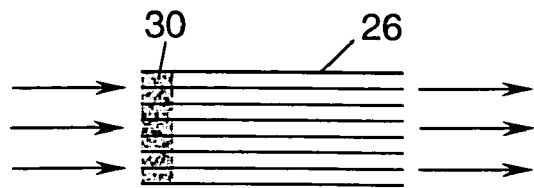
FIG. 2 shows a portion of a cross-section of a catalytic converter with a phosphorus trap integrated into the channels of the catalytic converter according to an aspect of the present invention.

Referring now to FIG. 2, another alternative configuration is shown. As described above, catalytic converter 26 contains many parallel passageways along its length, as shown in FIG. 2. According to an aspect of the present invention, the porous material, of which phosphorus trap 30 is comprised, is inserted into the upstream end of the passageways.

The inventors of the present invention have recognized that unburned or partially oxidized engine oil containing ZDDP additive, condenses in the exhaust gas when the temperature is lower than about 200° C. Such condensable material is captured by the catalytic converter with high efficiency unlike more fully oxidized phosphorus containing species which exist in the vapor form and have greater likelihood of passing through the catalytic converter without being captured. The mechanism, by which catalytic converter 26 is harmed, is that the unburned or partially oxidized phosphorus containing species condense on the surfaces of catalytic converter 26. Catalytic converter 26 contains high-surface-area components such as aluminum oxide and cerium oxide, on the surface. Unoxidized and partially oxidized phosphorus species (arising from ZDDP additive in the oil) adsorb onto these components. It is believed that the phosphorus species and the washcoat components form chemical bonds. Based on the present day state of the art, no in situ, cost effective measure of breaking those chemical bonds has been determined. Thus, oxygen storage sites that have been contaminated by phosphorus compounds are essentially unrecoverable, i.e., they are no longer able to participate in catalytic reactions.

The inventors of the present invention have performed laboratory experiments showing contamination or capture efficiency of the partially oxidized or unoxidized phosphorus species of at least 50% and possibly up to nearly 100% in catalytic converter 26.

When exhaust temperature exceeds about 400-500° C., partially oxidized or unoxidized phosphorus species largely react to form fully oxidized phosphates or species, which are more oxidized, such as phosphoric acid, phosphorus pentoxide, and a dimer of phosphorus pentoxide. These species are vapor phase, even at temperatures below 200-250° C. These species do not normally condense until the exhaust gas temperature falls to levels below 80-100° C. where condensation occurs along with condensation of water from the exhaust gases. The inventors of the present invention have found that the capture efficiency of these vapor phase phosphorus compounds and the phosphate related particulates (eg., zinc phosphate) is less than about 20% in catalytic converter 26 and the phosphates are largely benign. Thus, the inventors of the present invention have recognized that if harmful condensable phosphorus species can be prevented from entering the catalytic converter when the temperature is less than 200-250° C., when the exhaust system subsequently achieves a temperature exceeding 400° C., harmful condensable phosphorus species react into the less harmful vapor species or to the nearly harmless phosphates. The probability of the phosphorus materials poisoning catalyst 26 reduces from 50% to 20% if reacted to the vapor species or to much less than 20% if reacted to phosphates. The poisoning risk to catalyst 26 is reduced by more than 60%. The oxidation temperature for the phosphorus species is in the range of 200-250° C. Below, the temperature 225° C. is used to indicate this range.

In engines equipped with three-way, oxygen-storing catalytic converters exhaust temperatures are below 225° C. only during cold start and extended idle periods. Thus, if condensable phosphorus species are collected in trap 30 prior to entering catalyst 26, these condensable phosphorus species convert to less harmful species when the temperature in trap 30 rises above 225° C. Thus, the trap regenerates spontaneously when exhaust temperature achieves normal operating temperature. The inventors of the present invention have recognized that only a small amount of the condensable phase phosphorus species is generated by the engine during any such operating interval with low exhaust temperatures, except for unusual operating patterns and thus, the desired volume of trap 30 capable of capturing the emitted material is small. On an exceptional basis, exhaust temperatures may remain low under unusual operating cycles, which is discussed in more detail below. The small size and mass of trap 30, according to the present invention, overcomes the disadvantage of traps with large thermal inertia of prior approaches. Trap 30 is constructed of ceramic or metallic foam of pore size roughly 100 micrometers and a minimum pore size of 20 micrometers. Alternatively, trap 30 may be constructed of other porous materials, which provide pore sizes as mentioned above, random passages there through, and can withstand the temperatures encountered in the exhaust duct. Unlike catalytic converter 26, which has parallel passageways through which the exhaust gases pass, trap 30 has random passageways causing the exhaust gases to twist and turn to pass through trap 30. It is the inability of the droplets and aerosol particles to negotiate turns in trap 30 that causes them to impact onto the foam material itself. The inventors of the present invention have recognized that the volume of trap 30 is less than about 10% of the swept volume (or displacement) of engine 10. Swept volume is found by multiplying the cross-sectional area of a piston times the travel distance of the piston during a single stroke times the number of cylinders in engine 10.

Trap 30 can be coated with a washcoat similar to that used in a three-way catalyst. Trap 30 would be beneficial in reducing tailpipe emissions during cold start, i.e., prior to when catalyst 26 has reached operating temperature. The washcoat of trap 30 would become poisoned over time and its ability to provide conversion hampered. Nevertheless, during the time that trap 30 is fresh, cold start emissions would be reduced.

If engine 10 is a multi-bank engine, eg. V-8, in which catalysts are disposed in exhaust ducts coming from each bank of the engine, preferably a phosphorus trap 30 is placed in each exhaust duct upstream of the catalyst. In this case, the volume of phosphorus trap 30 is related to the displaced volume of the cylinders to which it is coupled. Each trap 30 is comprised, preferably, of a single, integral structure requiring little external support, except for being held in place at the periphery. This is in contrast to a pellet-type trap comprised of numerous pellets which must be retained within a container.

It is known in the art to use a diesel particulate filter (DPF) to trap carbonaceous particles exhausted from a diesel engine. DPFs are designed such that they collect greater than 90% of all particles. To be able to collect the smallest particles (as small as several nanometers), the average pore size of a DPF is typically about 20 micrometers and a DPF has a volume roughly equal to 1-3 times the engine's displacement volume. Because of the DPF's small pore size and large volume, a DPF provides considerable resistance to exhaust gas flow, roughly 25 kPa when the trap is empty and roughly 50 kPa when the trap is full (these pressure drops occur at an engine condition generating peak engine power, i.e., when flow through the exhaust system is at highest). Typical DPFs are constructed of parallel channels along the direction of flow through the DPF. Every other channel is blocked on the upstream end. On the downstream end of the DPF those channels, which are unblocked on the upstream end, are blocked on the downstream end. This forces exhaust gases to traverse through channel walls. This has been found to allow high collection efficiency over a wide range of particle sizes.

In contrast, the desire is for phosphorus trap 30 to collect only particles greater than about several micrometers in diameter and allow the passage of smaller particles. The inventors of the present invention have recognized that it is preferable to allow smaller particles to travel through trap 30 without being trapped because smaller particles permanently lodged in trap 30 ultimately occludes the trap, causing a significant pressure drop. According to the present invention, phosphorus trap 30 has an average pore size of at least 50 micrometers with a minimum pore size of greater than about 20 micrometers. For the purposes of the present invention, trap 30 need only be about 10% of engine displaced volume, if the trap is made of metallic foam, and about 15% of engine displacement volume, if the trap is made of ceramic foam. Because of the relatively large pore size and small volume of trap 30, the pressure drop across trap 30 is negligible, less than about 1 kPa.

Typically, DPFs have a porosity of about 50%; whereas, the phosphorus trap 30, of the present invention, has a porosity greater than about 90%. Because of the high porosity and small volume of phosphorus trap 30, for a typical automotive engine, the mass of the porous material in phosphorus trap 30 is roughly 50 to 200 g depending on the material of trap 30. It is expected that the mass of phosphorus trap 30 be related to displacement of the cylinders to which trap 30 is coupled, eg., mass (in grams) of trap 30 is less than roughly engine displacement (in cubic centimeters) divided by 25. The length of trap 30 is about one-third of the diameter of the exhaust duct in which it is contained.

In the preceding discussion, collection characteristics of a DPF and a phosphorus trap 30 are compared. It was stated that phosphorus trap 30 collects particles above one micrometer in diameter. It is known, however, to those skilled in the art, that filters of the types discussed do not have sharp cutoffs in the size of particles collected. Thus, phosphorus trap 30, even though designed to collect particles greater in diameter than one micrometer, collects particles smaller than one micrometer, but at low efficiency. Furthermore, the collection efficiency, as a function of particle diameter, is affected by the velocity of the gases at the face of the filter or trap. Thus, the numbers given above are representative, but not limiting. Also, the specific characteristics of phosphorus trap 30 are given by way of example and are not intended to be limiting.

Figure 3:
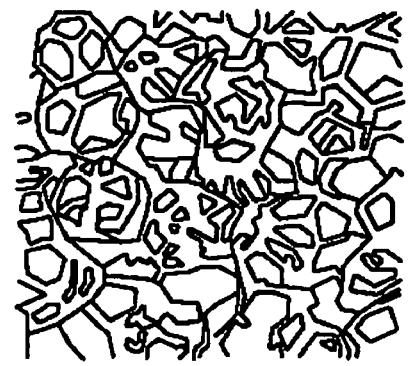
FIG. 3 shows a representative structure of a phosphorus trap.

An example of the structure of phosphorus trap 30 is shown in FIG. 3. FIG. 3 is a drawing based on a photomicrograph of the face of a metallic foam suitable for use as phosphorus trap 30. The magnification in the drawing is roughly 100×. The smaller pores, in FIG. 3, that are significantly smaller than the expected 100 micrometers are due to them being pores which are slightly below the surface, and thus partially occluded from view by portions of upper pores. It can be seen in FIG. 3 that the material is irregular causing gases to twist and turn randomly in passing through phosphorus trap 30.

As mentioned above, some vehicles with unusual operating patterns may operate for extended periods with the exhaust temperature less than 225° C. As example is a taxicab, which may idle for extended intervals. The inventors of the present invention have recognized that phosphorus trap 30 is purged of condensable phase phosphorus species if the temperature is raised above 225° C. for a short period. According to the present invention, it is determined when trap 30 can no longer retain more droplets containing condensable phase phosphorus species. When that determination is made, engine 10 operation is changed to cause the temperature in the exhaust to exceed 225° C.

Figure 4:
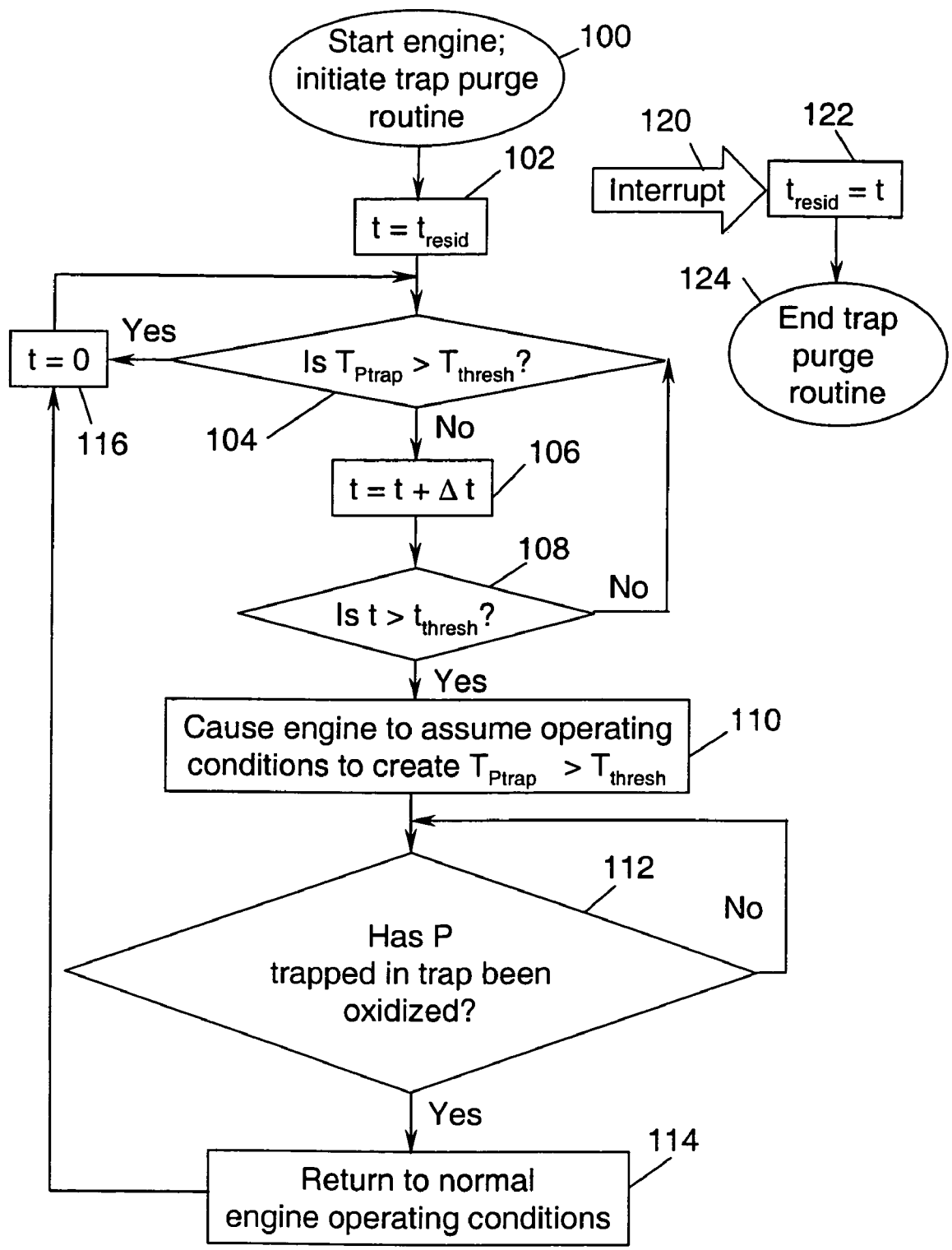
FIG. 4 is a flowchart of a method for operating an internal combustion engine according to an aspect of the present invention.

The method of purging phosphorus trap 30, according to an aspect of the present invention, is shown in FIG. 4. A phosphorus trap purge routine begins in step 100 when engine 10 is started. In step 102, RAM 80 memory location, t, is filled with the contents of a KAM 78 memory location, $t_{resid}$, which is the operating time elapsed since the last purge of trap 30. As engine 10 has just been started, the value of $t_{resid}$ is based on a prior operating interval of engine 10. In step 104, it is determined whether the temperature in trap 30, $T_{Ptrap}$, greater than a threshold temperature, $T_{thresh}$. $T_{thresh}$ is the temperature at which condensable phase phosphorus compounds oxidize to form less harmful phosphorus species. If step 104 yields a positive result, control passes to step 116, where t is reset to 0, which means that trap 30 is purged of condensable phase phosphorus species. In normal, warmed up operation, the routine of FIG. 4 cycles between steps 116 and 104. However, during unusual operating patterns and until engine 10 is warmed up, a negative result from step 104 occurs. Control then passes to step 106 in which memory location t is incremented by the time elapsed since the last time t was updated, Δt. In step 108, t is compared to $t_{thresh}$, which is a threshold time for which trap 30 has been operating long enough since the last purge to be substantially full. If a negative result from step 108, control passes back to step 104. If a positive result in step 108, control passes to step 110 where operating conditions of engine 10 are altered to cause $T_{Ptrap}$ to exceed $T_{thresh}$. Control passes to step 112 where a check whether trap 30 has had sufficient time to oxidize the condensable phase phosphorus species. If a negative result, engine 10 is maintained at the operating condition to keep $T_{Ptrap}$ above $T_{thresh}$. When a positive results from step 112, control passes to step 114 in which engine 10 is returned to normal operating conditions. Control passes to step 116 in which t is reset to 0. Also shown in FIG. 4 is an interrupt, step 120, which is when engine 10 is shut off. The routine of steps 100-116 is diverted to step 120, when the interrupt is received. Control passes to step 122, in which the current value of t is stored in $t_{resid}$, the latter of which is in KAM 78. The routine is ended in step 124.

Figure 5:
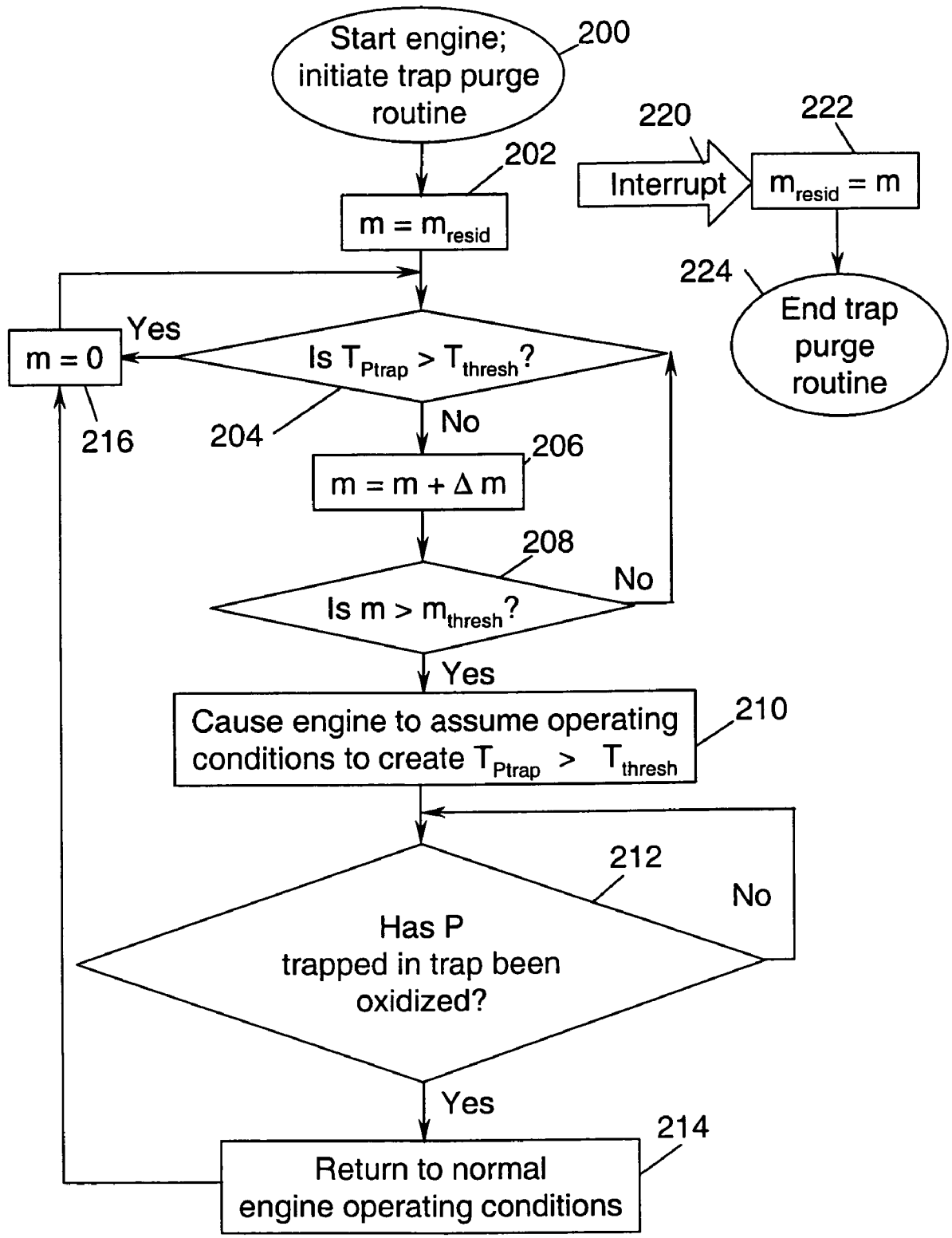
FIG. 5 is a flowchart of a method for operating an internal combustion engine according to an aspect of the present invention.

The routine discussed in regard to FIG. 4 is based on a time of operation since the last purge. An alternative is to model the amount of condensable phase phosphorus material that is released. The model could be based on engine speed, other engine operating parameters, which are known in ECU 40, or a combination of such parameters. Such a routine is shown in FIG. 5. The routine of FIG. 5 is identical to the routine of FIG. 4, except that rather than basing the purge on a time of operation, the purge is based on a modeled mass of condensable phase phosphorus species, m, in trap 30.

The method of purging phosphorus trap 30, according to an aspect of the present invention, is shown in FIG. 5. A phosphorus trap purge routine begins in step 200 when engine 10 is started. In step 202, RAM 80 memory location, m, is filled with the contents of a KAM 78 memory location, $m_{resid}$, which is the time elapsed since the last purge of trap 30. As engine 10 has just been started, the value of $m_{resid}$ is based on a prior operating interval of engine 10. In step 204, it is determined whether the temperature in trap 30, $T_{Ptrap}$, is greater than a threshold temperature, $T_{thresh}$. $T_{thresh}$ is the temperature at which condensable phase phosphorus compounds oxidize to form less harmful phosphorus species. If step 204 yields a positive result, control passes to step 216, where m is reset to 0, which means that trap 30 is purged of condensable phase phosphorus species. In normal, warmed up operation, the routine of FIG. 4 cycles between steps 216 and 204. However, during unusual operating patterns and until engine 10 is warmed up, a negative result from step 204 occurs. Control then passes to step 206 in which memory location t is incremented by the time elapsed since the last time t was updated, Δt. In step 208, t is compared to $t_{thresh}$, which is a threshold time for which trap 30 has been operating long enough since the last purge to be substantially full. If a negative result from step 208, control passes back to step 204. If a positive result in step 208, control passes to step 210 where operating conditions of engine 10 are altered to cause $T_{Ptrap}$ to exceed $T_{thresh}$. Control passes to step 212 where a check whether trap 30 has had sufficient time to oxidize the condensable phase phosphorus species. If a negative result, engine 10 is maintained at the operating condition to keep $T_{Ptrap}$ above $T_{thresh}$. When a positive results from step 212, control passes to step 214 in which engine 10 is returned to normal operating conditions. Control passes to step 216 in which m is reset to 0. Also shown in FIG. 4 is an interrupt, step 220, which is when engine 10 is shut off. The routine of steps 200-216 is diverted to step 220, when the interrupt is received. Control passes to step 222, in which the current value of m is stored in $m_{resid}$, the latter of which is stored in KAM 78. The routine is ended in step 224.

To cause the temperature of the exhaust to rise, as discussed in regards to step 110 of FIG. 4 and step 210 of FIG. 5, one or more of the following measures may be undertaken: retarding the spark timing for some or all cylinders, providing air and fuel to the exhaust such as by operating some cylinders rich and others lean or by introducing secondary air into the exhaust, loading engine 10 by causing the alternator to generate electricity for storage in the battery, loading engine 10 with a power consuming accessory such as air conditioning, reducing cooling water flow rate to engine 10, turning off an engine cooling fan, raising engine speed, reducing exhaust gas recirculation, changing valve timing in engines equipped with variable valve timing mechanisms, and raising the temperature of the intake air.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

The invention claimed is:

1. An exhaust aftertreatment system for a reciprocating internal combustion engine having at least one cylinder and a catalytic converter disposed in an exhaust duct of the engine which receives an exhaust gas stream from the engine, comprising a trap disposed in the exhaust duct located upstream of the catalytic converter, said trap is comprised of a porous ceramic or metallic material having a predetermined average pore size, said trap substantially fills the cross-section of the exhaust duct, said trap having a porosity greater than 90% wherein exhaust gases undergo multiple, random turns in traveling from an upstream side to a downstream side of said trap.

2. The exhaust aftertreatment system of claim 1, said average pore size is greater than about 80 micrometers.

3. The exhaust aftertreatment system of claim 1, said trap is capable of collecting more than 90% of particles greater than 50 micrometers in diameter.

4. The exhaust aftertreatment system of claim 1, said trap allows more than 50% of particles less than 1 micrometer in diameter to pass through.

5. The exhaust aftertreatment system of claim 1, said porous material is foam.

6. The exhaust aftertreatment system of claim 1, a pressure drop across said phosphorus trap is less than one kilopascal.

7. The exhaust aftertreatment system of claim 1 wherein said trap is located within 15 centimeters from an upstream end of the catalytic converter.

8. The exhaust aftertreatment system of claim 1, a volume of said trap is less than 10% of the swept volume of the engine's cylinders coupled to said trap.

9. The exhaust aftertreatment system of claim 1, wherein said trap is treated with a washcoat capable of catalyzing oxidation reactions of carbon monoxide and hydrocarbons in said exhaust gases.

10. An exhaust aftertreatment system for an internal combustion engine having at least one cylinder and a catalytic converter disposed in an exhaust duct of the engine which receives exhaust gas stream from the engine comprising: a trap disposed in the exhaust duct located upstream of the catalytic converter, said trap is comprised of channels through which the exhaust gas stream flows, said channels being irregular in cross-section wherein a trajectory of a centerline of said channels is random from an upstream face of said trap to a downstream face of said trap.

11. The exhaust aftertreatment system of claim 10, further comprising an exhaust gas component sensor disposed in the exhaust duct, said exhaust gas component sensor is located downstream of said trap to protect said sensor.

12. The exhaust aftertreatment system of claim 10, wherein said trap is treated with a washcoat capable of catalyzing oxidation reactions of carbon monoxide and hydrocarbons in said exhaust gases.

13. An exhaust aftertreatment system for a multi-cylinder, reciprocating internal combustion engine having a catalytic converter disposed in an exhaust duct of the engine, comprising a trap disposed in the exhaust duct located upstream of the catalytic converter, said trap is comprised of a metallic or ceramic porous material substantially filling the cross-section of the exhaust duct with randomly oriented passages through said porous material, a pressure difference between an upstream side and a downstream side of said phosphorus trap is less than1 kilopascal under all engine operating conditions.

14. The exhaust aftertreatment system of claim 13, said trap has a volume less than 10% of the swept volume of the cylinders coupled to said trap.

15. The exhaust aftertreatment system of claim 13, said porous material has a minimum pore size of about 20 micrometers.

16. The exhaust aftertreatment system of claim 13, said porous material has an average pore size of greater than about 80 micrometers.

17. The exhaust aftertreatment system of claim 13 wherein a pressure drop across said trap is less than 1 kilopascal.

18. The exhaust aftertreatment system of claim 13 wherein the catalytic converter is located within 15 centimeters of said trap.

19. An exhaust aftertreatment system for an internal combustion engine having at least one cylinder and a catalytic converter disposed in an exhaust duct of the engine which receives an exhaust gas stream from the engine, comprising: a trap disposed in the exhaust duct located upstream of the catalytic converter, said trap comprising a porous metallic or ceramic foam material having a plurality of irregularly shaped passages, walls of such passageways being provided by the foam material such walls being substantially thinner than such passageways.

20. The system of claim 19 wherein the material is greater than 90% porous.

21. The system of claim 19, said material is a foam with pore size greater than 20 micrometers and average pore size greater than 80 micrometers.

22. An exhaust aftertreatment system for an internal combustion engine having at least one cylinder and a catalytic converter disposed in an exhaust duct of the engine which receives an exhaust gas stream from the engine, comprising: a trap disposed in the exhaust duct located upstream of the catalytic converter, said trap comprising a porous metallic or ceramic material having a plurality of irregularly shaped passages, walls of such passageways being provided by the material, wherein said material is a foam with pore size greater than 20 micrometers and average pore size greater than 80 micrometers.

23. The system of claim 22 wherein such walls being substantially thinner than such passageways.

24. The system of claim 22 wherein the material is greater than 90% porous.

25. An exhaust aftertreatment system for a reciprocating internal combustion engine having at least one cylinder and a catalytic converter disposed in an exhaust duct of the engine which receives an exhaust gas stream from the engine, comprising a trap disposed in the exhaust duct located upstream of the catalytic converter, said trap is comprised of a porous ceramic or metallic foam material forming channels irregular in cross-section wherein a trajectory of a centerline of said channels is random from an upstream face of said trap to a downstream face of said trap.

* * * * *